(12) United States Patent
Yang et al.

(10) Patent No.: US 7,751,377 B2
(45) Date of Patent: Jul. 6, 2010

(54) WIRELESS NETWORK INTERFERENCE MITIGATION

(75) Inventors: Fan Yang, Beijing (CN); Qian Zhang, Beijing (CN); Kun Tan, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1390 days.

(21) Appl. No.: 11/168,849

(22) Filed: Jun. 28, 2005

(65) Prior Publication Data
US 2006/0291439 A1  Dec. 28, 2006

(51) Int. Cl.
*H04W 4/00* (2009.01)
(52) U.S. Cl. .................. 370/338; 370/216; 370/359; 370/480; 455/63.1; 455/450
(58) Field of Classification Search .............. 370/338, 370/216, 346, 347, 359, 445, 480, 328, 401, 370/255; 455/63.1, 114.2, 303, 450, 513, 455/552.1
See application file for complete search history.

(56) References Cited

U.S. PATENT DOCUMENTS 6,917,591 B2 * 7/2005 St. John ...................... 370/235
7,197,291 B2 * 3/2007 Mach et al. .................. 455/303
7,366,202 B2 * 4/2008 Scherzer et al. ............. 370/480

OTHER PUBLICATIONS

Lakshminarayanan, et al.; "Bandwidth Estimation in Broadband Access Networks"; ACM IMC 2004; Taormina, Sicily, Italy, Oct. 2004; 8 pages.

* cited by examiner

*Primary Examiner*—Matthew D Anderson
*Assistant Examiner*—Shaima Q Aminzay
(74) *Attorney, Agent, or Firm*—Lee & Hayes, PLLC

(57) ABSTRACT

Wireless network interference is mitigated with client devices having wireless network interference mitigation logic and/or utilizing a usable bandwidth channel quality metric. In a described example implementation, a client device includes wireless network interference mitigation logic that monitors at least one channel condition of a wireless network and participates in a wireless network interference mitigation procedure based on the at least one channel condition. In another described example implementation, a usable bandwidth of a wireless channel is ascertained with respect to a native network, the usable bandwidth reflecting a difference between (i) a total channel capacity of the wireless channel and (ii) a portion of the total channel capacity that is consumed by wireless communications of one or more foreign networks. By way of example only, the at least one channel condition may be usable bandwidth. The wireless network interference mitigation logic may also be employed in non-client devices.

15 Claims, 7 Drawing Sheets

WIRELESS NETWORK INTERFERENCE MITIGATION

BACKGROUND

The adoption of wireless communications is proceeding at breakneck speed. In addition to well-known wireless telecommunication capabilities (e.g., through cellular networks), wireless local area network (LAN) technology is also available. An example of wireless LAN technology is the IEEE 802.11 standard, which may be implemented in many different manners (e.g., (a), (b), (e), (g), etc.).

Instead of communicating over the wires of a traditional LAN, communications in wireless LANs are effectuated over wireless links. The wireless communications of a wireless LAN often terminate at an element that forwards the communication over a wired medium of another network, such as the Internet. This fixed element that acts as a gateway between wired network(s) and mobile clients of the wireless LAN is often termed an access point (AP). However, APs may alternatively have more and/or different functions besides being a gateway.

An AP thus facilitates wireless communications between a given mobile client and other networks. The AP, however, may also be responsible for acting as an intermediary between two or more mobile clients within a single wireless LAN. Unfortunately, for either case, interference can jeopardize and actually prevent the successful reception of a wireless communication being sent from between a sender and receiver of a wireless LAN.

SUMMARY

Wireless network interference is mitigated with client devices having wireless network interference mitigation logic and/or utilizing a usable bandwidth channel quality metric. In a described example implementation, a client device includes wireless network interference mitigation logic that monitors at least one channel condition of a wireless network and participates in a wireless network interference mitigation procedure based on the at least one channel condition. In another described example implementation, a usable bandwidth of a wireless channel is ascertained with respect to a native network, the usable bandwidth reflecting a difference between (i) a total channel capacity of the wireless channel and (ii) a portion of the total channel capacity that is consumed by wireless communications of one or more foreign networks. By way of example only, the at least one channel condition may be usable bandwidth. The wireless network interference mitigation logic may also be employed in non-client devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, other method, system, approach, apparatus, device, media, procedure, application programming interface (API), arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Figure 1:
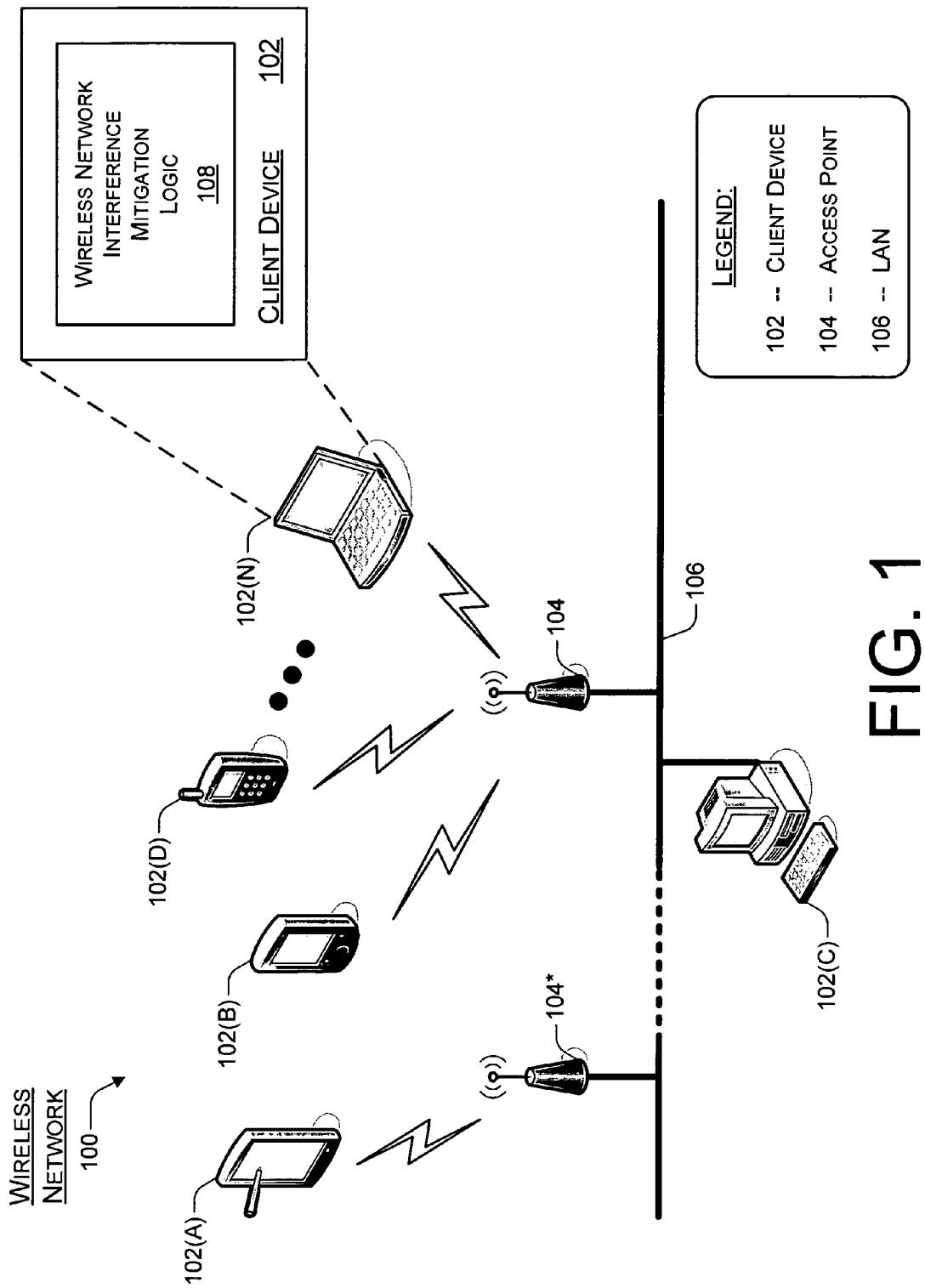
FIG. 1 is an example of a wireless network with client devices that include wireless network interference mitigation logic.

As explained above, the communication capabilities of wireless networks are frequently curtailed by interference. In this context, interference in a given native network can arise from devices in foreign networks, devices in the native network, multipath fading, physical obstacles, some combination thereof, and so forth. If the effects of interference are managed in a wireless network, the communication capabilities thereof can be improved. Unfortunately, wireless networks in a home or small business environment have the following characteristics that make their management difficult.

First, the performance of wireless networks in the home and other indoor environments is highly dynamic and error-prone because wireless communications suffer greatly from severe multi-path fading within physical structures. Additionally, there are interference sources within homes and small offices, such as microwave ovens. Second, the placement of wireless devices is usually geographically constrained. For instance, family members usually wish to use their wireless client devices at any and all locations within (and often around) a home. Moreover, an optimal placement of the wireless AP device in a given room may be occupied by furniture or may be aesthetically unpleasing.

Third, the capacity of wireless networks is constrained because they have to compete with other types of wireless devices (e.g., Bluetooth devices, DECT phones, etc.) that share the same wireless spectrum. More significantly, wireless networks have to share the same wireless spectrum with other nearby wireless networks that are deployed in the vicinity, especially given the recent proliferation of wireless networks. Fourth, wireless networks within homes and small offices are usually operated and managed by non-professionals. Consequently, simplified deployment and management of such wireless networks is welcomed. More specifically, most home users and small business owners prefer that wireless network performance management be performed relatively automatically with little or no user oversight.

Wireless AP vendors often provide setup tools to enable operation (e.g., deployment and/or management) of APs. However, the default settings of these setup tools that are provided by AP vendors only make wireless networks workable. They rarely if ever produce an optimal network configuration. Moreover, using the default settings is likely to result in greater interference between and among different proximate wireless networks, particularly if their APs are from the same vendor.

Any management-type tools that are provided by AP vendors focus on the AP portion of the wireless network to the exclusion of client devices. Consequently, such AP management-type tools are not aware of at least the specifics of the wireless interference effects that the client devices are experiencing. Additionally, AP management-type tools are targeted toward professionals that have been trained to manually tune a network's configuration.

Some client devices do include logic to facilitate connecting to a wireless network. However, such client devices do not include logic for managing the wireless network. Accordingly, existing approaches to wireless network operation fail to involve client devices, require the expertise and knowledge of trained professionals, and/or do not provide any wireless network management functions.

Fortunately, wireless networks that are deployed in home or small business environments are usually of a relatively small scale. For example, the number of wireless APs deployed in typical home or small business is around one or two APs. Although implementations that are described herein are not limited to small-scale wireless networks, they are particularly effective in such situations due to the relative feasibility of automatically managing wireless networks with one or two APs.

Certain described implementations enhance wireless network performance by automatically adjusting wireless network configuration parameters. Examples of wireless network configuration parameters that may be automatically adjusted include, but are not limited to, (i) tuning the wireless channel, (ii) changing the power level of a wireless AP, and/or (iii) indicating a superior AP to which a wireless client device should associate when multiple APs are deployed within a single wireless network.

In a described example implementation, wireless network management architecture enables wireless client devices of a wireless network to collectively report on network conditions and to potentially improve the performance of the wireless network based on the reported network conditions in conjunction with one or more wireless APs. Wireless network parameters such as the channel and power level may then be controlled in an automated manner based on channel quality information from each of the wireless client devices.

In another described example implementation, a reported network condition is termed usable bandwidth of a native wireless network. Usable bandwidth of the native wireless network comprises the difference between a total capacity of a given channel and the capacity of the given channel that is consumed by foreign wireless networks. In other words, usable bandwidth from the perspective of a particular client device of a native network comprises the bandwidth that may be utilized by client devices of the native network after subtracting from a total channel capacity the bandwidth that is already consumed by wireless communications from foreign networks.

This description is separated into three additional sections. A first section references FIGS. 1-4 and is entitled "Wireless Network Interference Mitigation Examples with Client Devices". A second section references FIGS. 5A, 5B, and 6 and is entitled "Wireless Network Interference Mitigation Examples with Usable Bandwidth". There is also a third section that references FIG. 7 and is entitled "Example Operating Environment for Computer or Other Device".

Wireless Network Interference Mitigation Examples with Client Devices

FIG. 1 is an example of a wireless network 100 with client devices 102 that include wireless network interference mitigation logic 108. As illustrated, wireless network 100 includes an access point (AP) 104 and "N" wireless client devices 102(1 . . . N). Specifically, wireless network 100 includes client device 102(A), client device 102(B), client device 102(C), client device 102(D) . . . client device 102(N).

As shown, client device 102(B), client device 102(D), and client device 102(N) are in wireless communication with AP 104 as indicated by the wireless links that are represented by "lightning bolt" symbols. Client device 102(C) is shown connected to AP 104 via a LAN 106. Nevertheless, client device 102(C) may also be capable of communicating with AP 104 via a wireless link. Wireless network 100 may also include one or more other APs 104*. In FIG. 1, there is one second AP 104*. Client device 102(A) is in wireless communication with the second AP 104*.

As illustrated, client device 102(A) is a tablet personal computer (PC), client device 102(B) is a personal digital assistant (PDA), client device 102(C) is desktop PC, client device 102(D) is a mobile phone (e.g., a so-called smart or intelligent phone), and client device 102(N) is a laptop computer. However, wireless client devices 102 may generally be any client device with a wireless capability; hence, client device 102(C) may also be considered a wireless client device (as well as a wired client device) if it possesses a wireless capability. Additional examples of client devices that may have wireless capabilities are described further herein below with particular reference to FIG. 7.

As specifically illustrated for client device 102(N), one or more (including all) client devices 102 comprise wireless network interference mitigation logic 108. Wireless network interference mitigation logic 108 may be hardware, software, firmware, some combination thereof, and so forth. Wireless network interference mitigation logic 108 is capable of monitoring network conditions and is adapted to mitigate interference based on the monitored network conditions. More specifically, the wireless network interference mitigation logic 108 of associated client devices 102 are adapted to jointly mitigate wireless interference within the wireless network 100 in which the associated client devices 102 are operating.

In a described implementation, wireless network interference mitigation logic 108 is generally adapted to monitor channel conditions at client devices 102 and to participate in a wireless network interference mitigation procedure or protocol. A particular client device 102 is elected coordinator. The elected coordinator is empowered to analyze collected channel condition information and to make wireless network interference-mitigating decisions that result in adjustments to the wireless network configuration. Although a number of channel quality metrics may be employed to monitor channel conditions, usable bandwidth, which is introduced and described below, is employed in an example implementation.

More specifically, wireless network interference mitigation logic 108 is capable of monitoring a channel condition. It is adapted to detect when the monitored channel condition violates a predetermined threshold. Upon the condition violation detection, the detecting wireless network interference mitigation logic 108 sends a report to the wireless network interference mitigation logic 108 that is the elected coordinator.

The elected coordinator solicits channel condition information from the wireless network interference mitigation logic 108 of other client devices 102. An analysis is performed on the collected channel condition information to determine a better, if not optimal, wireless network configuration. The adjustments to create the improved wireless network configuration that mitigates interference are then sent to AP 104 and/or client devices 102.

Figure 2:
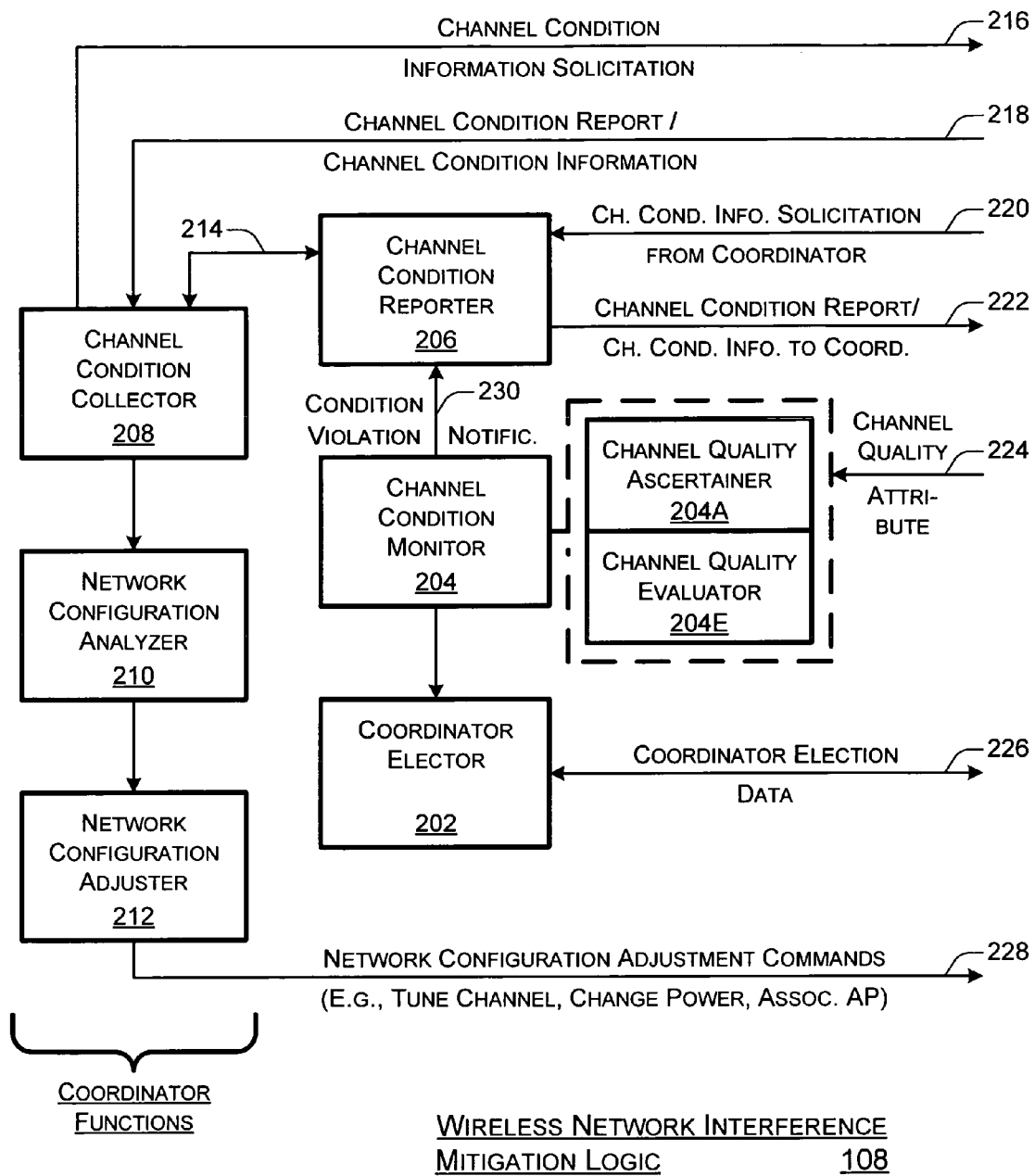
FIG. 2 is a block diagram example of wireless network interference mitigation logic for a client device of a wireless network.

FIG. 2 is a block diagram example of wireless network interference mitigation logic 108 for a client device of a wireless network, such as a client device 102 of wireless network 100 (both of FIG. 1). As illustrated, wireless network interference mitigation logic 108 includes six (6) "primary" component blocks 202-212 and two (2) "subsidiary" component blocks 204A and 204E. Each of the components may be realized in hardware, software, firmware, some combination thereof, and so forth.

With an AP-based wireless network management system, any existing managing entity defaults to the AP. With a client-capable wireless network management system, on the other hand, multiple client devices 102 are operating within a single wireless network 100. Consequently, there is no particular default controller/coordinator for a client-capable wireless network management system. Hence, in a described implementation, a client coordinator is initially elected.

Coordinator elector 202 is capable of exchanging coordinator election data 226 with other client devices 102 having wireless network interference mitigation logic 108. Coordinator elector 202 is adapted to participate in an election process to elect a network coordinator. The election may be random or based on any one or more of a variety of factors. If based on one or more factors, the election may be based on: (i) the first client device 102 that is deployed, (ii) the client device 102 with the best signal from AP 104, (iii) the client device 102 that is connected to wireless network 100 most frequently and/for the greatest percentage of time, (iv) the client device 102 with the greatest computing power or battery life (or one that is plugged in), (v) the client device 102 with the most up-to-date version of wireless network interference mitigation logic 108, (iv) some combination thereof, and so forth.

In a described implementation, the client device 102 with the best signal connection is elected as the coordinator by coordinator electors 202. Thus, coordinator election data 226 in this implementation includes at least signal connection data. Signal connection (e.g., channel quality) data may be provided from channel condition monitor 204 to coordinator elector 202. Under this criterion, client device 102(C) (of FIG. 1) is elected the coordinator because it has the best signal connection to AP 104 via LAN 106. However, other wireless networks may elect a client device 102 that does not posses a wired connection to AP 104. The coordinator may also be re-elected (i) on a periodic basis, (ii) when the current coordinator's signal quality connection decreases, (iii) on the occurrence of some other event, (iv) and so forth.

Channel condition monitor 204 is capable of monitoring the condition of at least one channel of wireless network 100. Channel condition monitor 204 is adapted to notify channel condition reporter 206 with notification 230, if the condition of the currently-utilized channel becomes unsatisfactory.

In an example implementation, channel condition monitor 204 includes a channel quality ascertainer 204A and a channel quality evaluator 204E. Channel quality ascertainer 204A accepts as input at least one channel quality attribute 224 that is associated with the currently-used channel. It is adapted to ascertain the channel quality responsive to the received channel quality attribute 224.

Channel quality evaluator 204E is capable of evaluating the ascertained channel quality in terms of an acceptable level of the channel quality. It is adapted to determine if the ascertained channel quality becomes unacceptable by violating the accepted level. If the accepted channel quality level is violated, then a notification 230 of the channel condition violation is provided to channel condition reporter 206 from channel condition monitor 204.

Channel condition reporter 206 receives a channel condition violation notification 230 from channel condition monitor 204. In response, channel condition reporter 206 sends a channel condition report 222 to the elected coordinator. In a described implementation, the channel condition report includes an ascertained channel quality for each of the channels that are available within wireless network 100. In such an implementation, the channel condition of the available channels may be ascertained on a regular basis. This regular basis may be any given period of time; for example, the channel conditions of available channels may be ascertained every 1-2 hours (e.g., 10-12 times per day). Alternatively, channel condition monitor 204 may ascertain the channel conditions of the available channels after a channel condition violation is detected by channel quality evaluator 204E.

On the other hand, fewer than all of the possible channels may be monitored and/or included in the channel condition report. For example, the channel condition of the currently-utilized channel may be solely included in the channel condition report. In such an implementation, channel conditions of the other available channels may be sent to the coordinator, and possibly ascertained, upon receipt of a channel condition information solicitation 220 from the elected coordinator (as described further below with particular reference to channel condition collector 208 and channel condition information solicitation 216). The channel condition report implicitly indicates the existence of a channel condition violation and/or includes an explicit channel condition violation indication.

The general functions of wireless network interference mitigation logic 108 are represented by coordinator elector 202, channel condition monitor 204, and channel condition reporter 206. The coordinator functions of wireless network interference mitigation logic 108 are represented by channel condition collector 208, network configuration analyzer 210, and network configuration adjuster 212. FIG. 2 is described further below in terms of wireless network interference mitigation logic 108 being the elected coordinator for wireless network 100.

Channel condition collector 208 receives the channel condition report 218 from a channel condition reporter 206. In response to receiving the channel condition report that indicates a channel condition violation, channel condition collector 208 is adapted to collect channel condition information from the other client devices 102 of wireless network 100. To elicit the channel condition information, channel condition collector 208 sends a channel condition information solicitation 216 to the other client devices 102 of wireless network 100.

When wireless network interference mitigation logic 108 of another client device 102 receives a channel condition information solicitation 220 from the channel condition collector 208 of the elected coordinator, it is provided to channel condition reporter 206. In response to receiving the channel condition information solicitation 220 from the coordinator, channel condition reporter 206 sends channel condition information 222 back to the channel condition collector 208 of the elected coordinator. If channel condition reporter 206 does not possess current channel condition information, channel quality ascertainer 204A of channel condition monitor 204 may be prompted to ascertain updated channel condition information from channel quality attributes 224.

An example of channel condition information is described further below with particular reference to FIG. 6. When a channel condition reporter 206 and a channel condition collector 208 of the same wireless network interference mitigation logic 108 are communicating, they may exchange reports, solicitations, information, etc. via an internal communication pathway 214 without using the incoming communication paths 220 and 218 or the outgoing communication paths 216 and 222.

After sending out a channel condition information solicitation 216, channel condition collector 208 usually receives channel condition information 218 from each of the client devices 102 of wireless network 100. However, if less than all of the client devices 102 of wireless network 100 are participating in the interference mitigation, channel condition collector 208 will not receive channel condition information from each and every client device 102. A client device 102 may not be participating if, for example, it does not include wireless network interference mitigation logic 108; it elects not to participate for security, power, or other reasons; and so forth.

The channel condition information (for most likely multiple client devices 102 of wireless network 100) is forwarded from channel condition collector 208 to network configuration analyzer 210. Network configuration analyzer 210 is capable of analyzing the channel condition information from multiple client devices 102 across multiple available channels. Network configuration analyzer 210 is adapted to determine a new network configuration that enhances the overall communication situation for the nodes of wireless network 100 based on at least one criterion. Examples of network configuration analysis and analysis criteria are described further herein below with particular reference to FIG. 6.

Thus, network configuration analyzer 210 determines an enhanced network configuration for wireless network 100 responsive to one or more channel conditions and based on at least one criterion. This enhanced network configuration is forwarded from network configuration analyzer 210 to network configuration adjuster 212.

Network configuration adjuster 212 is adapted to implement or otherwise effectuate the enhanced network configuration by formulating network configuration adjustment commands 228 and sending them to other nodes of wireless network 100. These other nodes may be client devices 102, APs 104, both client devices 102 and APs 104, and so forth. Examples of network configuration adjustment commands include, but are not limited to, tuning the wireless channel(s) on which client devices 102 are communicating, changing a power level of AP 104 (and/or AP 104*), instructing a client device 102 to associate with a different AP 104/104*, some combination thereof, and so forth.

Figure 3:
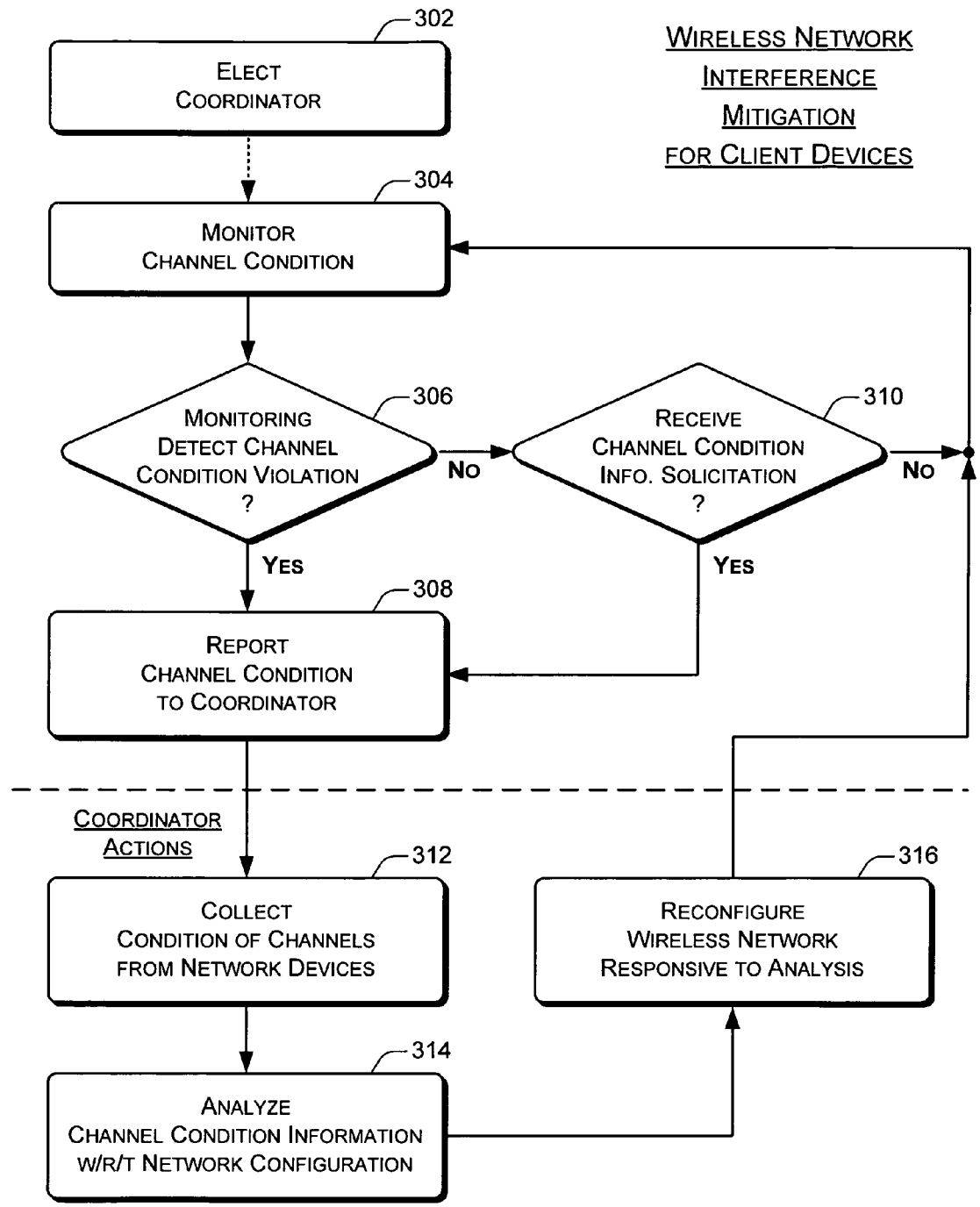
FIG. 3 is a flow diagram that illustrates an example of a method for wireless network interference mitigation using one or more client devices.

FIG. 3 is a flow diagram 300 that illustrates an example of a method for wireless network interference mitigation using one or more client devices. Flow diagram 300 includes eight (8) blocks 302-316. Although the actions of flow diagram 300 may be performed in other environments and with a variety of hardware and software combinations, FIGS. 1 and 2 are used in particular to illustrate certain aspects and examples of the method. By way of example only, the actions of flow diagram 300 may be performed by wireless network interference mitigation logic 108 of a client device 102.

Generally, the five (5) blocks 302-310 are performed by each client device 102, and the three (3) blocks 312-316 are performed primarily by the client device 102 that has been elected coordinator. At block 302, a coordinator is elected. For example, a client-based wireless network management coordinator may be elected by the coordinator electors 202 of multiple client devices 102 of wireless network 100 based on one or more factors, such as signal connection strength.

At block 304, the condition of at least the current channel is monitored. For example, channel quality ascertainer 204A of channel condition monitor 204 may ascertain the channel quality of at least the currently-utilized channel. In a described implementation, channel condition monitor 204 also monitors each available channel of wireless network 100 every given period (e.g., every hour or two) in order to be prepared to create a channel condition report that includes the condition of the available channels and/or to provide channel condition information in response to receiving a channel condition information solicitation.

At block 306, it is determined if the monitoring detects a channel condition violation. For example, it may be determined by channel quality evaluator 204E of channel condition monitor 204 if/when the ascertained channel quality violates a predetermined channel condition. An example channel condition monitoring procedure is described further below with particular reference to FIG. 4. If the monitoring does detect a channel condition violation (at block 306), then the method of flow diagram 300 continues at block 308. If, on the other hand, the monitoring does not detect a channel condition violation (at block 306), then the method of flow diagram 300 continues at block 310.

Thus, if the monitoring does not detect (at block 306) a channel condition violation, it is determined at block 310 if a channel condition information solicitation is received. For example, it may be determined by channel condition reporter 206 if a channel condition information solicitation 220 is received from the elected coordinator. If no channel condition information solicitation has been received, then the method of flow diagram 300 continues at block 304 with ongoing channel condition monitoring. If, on the other hand, a channel condition information solicitation has been received (as determined at block 310), then channel condition information (e.g., the most recent channel condition information) is reported to the elected coordinator at block 308. For example, channel condition reporter 206 may report channel condition information 222 to the elected coordinator.

Also, if the monitoring does detect (at block 306) a channel condition violation, then at block 308 a channel condition violation is reported to the elected coordinator. For example, if channel condition monitor 204 does detect a channel condition violation, then channel condition monitor 204 may forward a channel condition violation notification 230 to channel condition reporter 206. In response to receiving the channel condition violation notification 230, channel condition reporter 206 may send a channel condition report 222 to the elected coordinator. The channel condition report implicitly or explicitly indicates a channel condition violation to the elected client-level coordinator.

At block 312, the conditions of channels are collected from network devices. For example, responsive to a received channel condition report 218, a channel condition collector 208 may issue a channel condition information solicitation 216 to wireless client devices 102. Generally, the greater the number of wireless devices, which are participating in a given network, from which channel condition information is collected, the better (e.g., the more accurate) will be the resulting analysis. In other words, acquiring channel condition information via one or from only a relatively few devices in a network cannot usually provide the same overall view of a wireless network situation. Thus, to achieve the most holistic view of radio conditions across a wireless network, channel condition information is collected from as many client devices (and optionally APs) as possible. In response to the solicitation, channel condition collector 208 receives channel condition information 218 from the wireless client devices 102.

At block 314, the collected channel condition information is analyzed with respect to current and potential network configurations. For example, network configuration analyzer 210 may analyze the collected channel condition information based on at least one criterion. The analysis may result in an enhanced wireless network configuration. The likelihood of determining an accurate enhanced wireless network configuration increases as the number of participating devices that report channel condition information increases and as the distribution of reporting wireless devices expands.

At block 316, the wireless network is reconfigured responsive to the analysis. For example, wireless network 100 may be reconfigured by network configuration adjuster 212 responsive to the analysis results of network configuration analyzer 210 that identifies an enhanced wireless network configuration.

Figure 4:
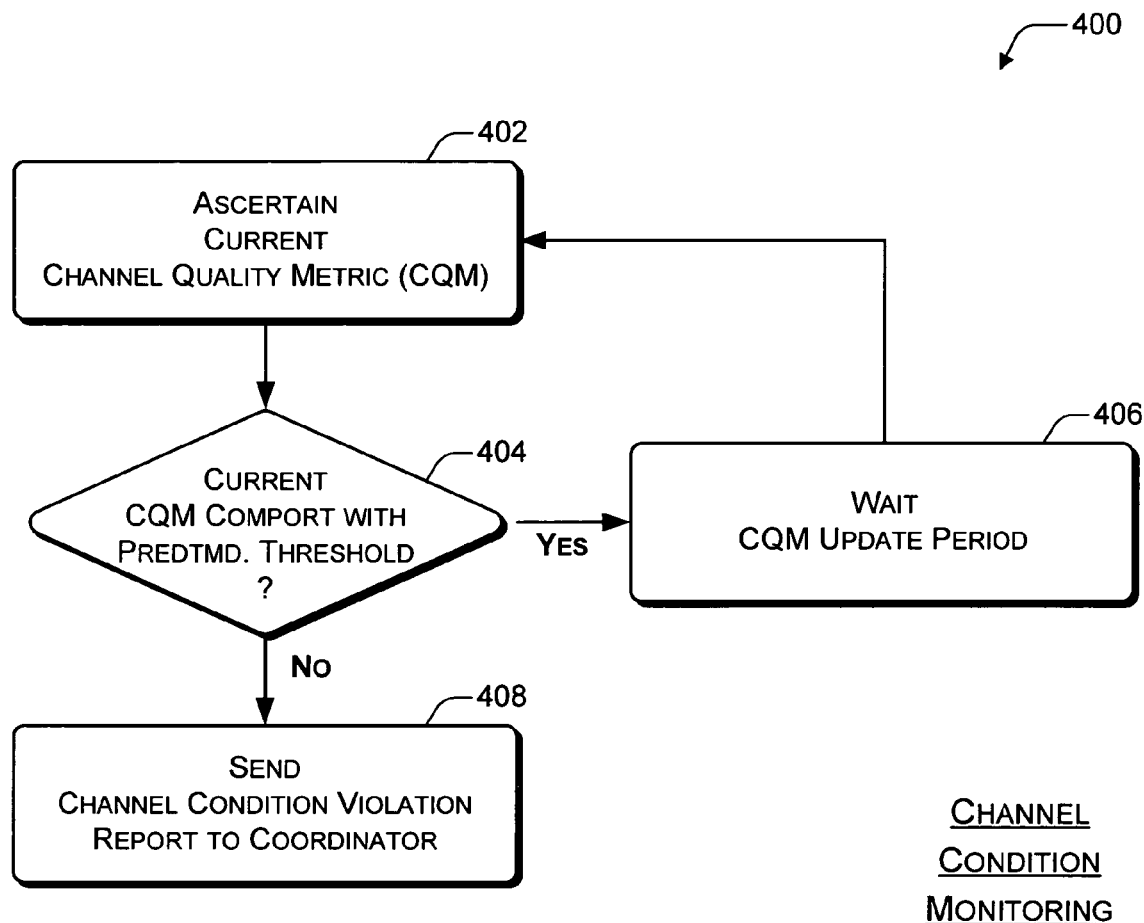
FIG. 4 is a flow diagram that illustrates an example of a method for channel condition monitoring by one or more client devices.

FIG. 4 is a flow diagram 400 that illustrates an example of a method for channel condition monitoring by one or more client devices. Flow diagram 400 includes four (4) blocks 402-408. Although the actions of flow diagram 400 may be performed in other environments and with a variety of hardware and software combinations, FIGS. 1 and 2 are used in particular to illustrate certain aspects and examples of the method. By way of example only, the actions of flow diagram 400 may be performed by channel quality ascertainer 204A and channel quality evaluator 204E of channel condition monitor 204.

At block 402, a current channel quality metric (CQM) is ascertained. For example, channel quality ascertainer 204A of channel condition monitor 204 may ascertain a current CQM responsive to the received channel quality attribute 224.

At block 404, it is determined if the ascertained current CQM comports with a predetermined threshold. For example, channel quality evaluator 204E of channel condition monitor 204 may determine if the ascertained CQM meets (e.g., is less than or exceeds, depending on the CQM) a predetermined threshold. The predetermined threshold may be preset, user selectable, variable based on network conditions, updateable by firmware, some combination thereof, and so forth. Examples of suitable CQMs are described below.

If the current CQM comports with the predetermined threshold (as determined at block 404), then at block 406 the channel condition monitoring pauses to wait for a CQM update period. After expiration of the CQM update period, the current CQM is again ascertained (at block 402). The CQM update period may also be preset, user selectable, variable based on network conditions, updateable by firmware, some combination thereof, and so forth. In an example implementation, the CQM update period is one to two hours.

If, on the other hand, the current CQM does not comport with the predetermined threshold (as determined at block 404), then at block 408 a channel condition violation report is sent to the elected coordinator. For example, channel condition monitor 204 in conjunction with channel condition reporter 206 may send a channel condition report 222 to a channel condition collector 208 of the elected coordinator.

The CQM that is used in any given implementation may be any ascertainable channel quality metric or channel quality metrics. Examples of applicable CQM types include, but are not limited to, (i) signal to interference/noise ratio (SINR), (ii) channel capacity, (iii) available bandwidth, (iv) usable bandwidth, and/or some combination thereof.

Generally, the higher the SINR is, the better the channel condition is. Channel capacity is the maximum achievable data rate in the associated wireless channel. Available bandwidth in a wireless channel is the difference between the channel capacity and the data rate of the cross traffic. The cross traffic when ascertaining available bandwidth is traffic on the associated observed channel from both foreign network(s) and other client devices in the native network of the client device that is ascertaining the available bandwidth.

CQM types (i) and (ii) are somewhat interchangeable from a network configuration analysis perspective. However, between the two, the SINR is relatively harder to obtain at the application layer. CQM types (ii) and (iii) are application layer metrics, and they can be obtained via probing techniques.

As introduced above, usable bandwidth is the CQM used to reflect the channel condition in a wireless network in certain described implementations. The usable bandwidth is the difference between the total channel capacity of a given wireless channel and the data rate of the cross traffic, but the cross traffic in the context of ascertaining usable bandwidth is the traffic in foreign networks that can be sensed by the wireless client device that is ascertaining the usable bandwidth. In other words, traffic generated from other devices in the native network of the ascertaining wireless client device is excluded from the cross traffic total.

Usable bandwidth is therefore typically a more accurate channel quality metric than channel capacity because usable bandwidth considers both capacity and the traffic in the channel. Also, usable bandwidth is therefore typically a fairer channel quality metric than available bandwidth because usable bandwidth considers the traffic from other (foreign) networks but not the traffic from the native network. Usable bandwidth is described further below with particular reference to FIGS. 5A and 5B.

Wireless Network Interference Mitigation Examples with Usable Bandwidth

Figure 5A:
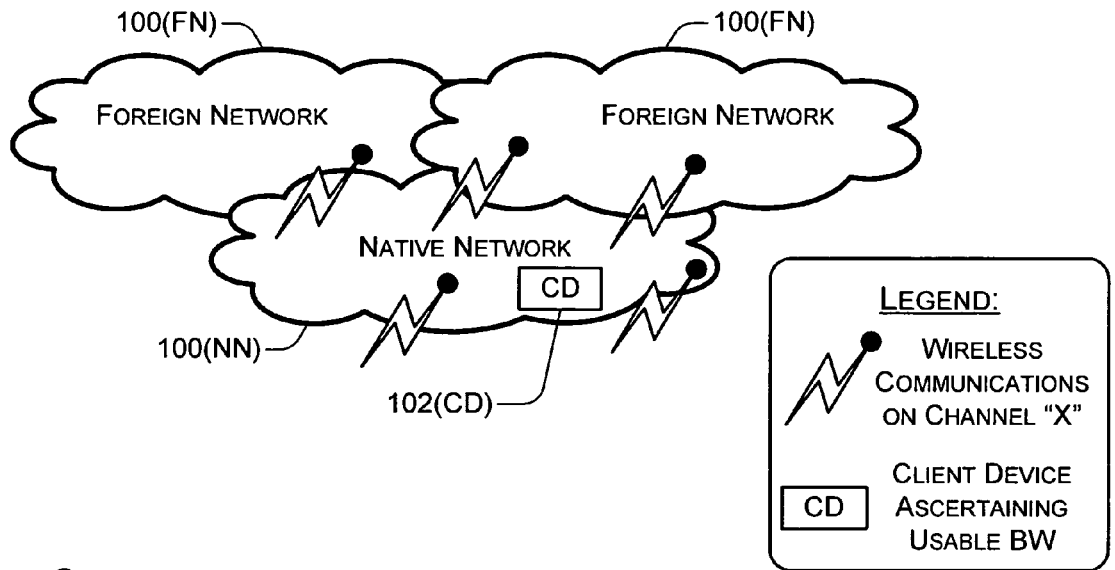
FIGS. 5A and 5B illustrate an example portion of total channel capacity that comprises usable bandwidth for client devices of a native network.
Figure 5B:
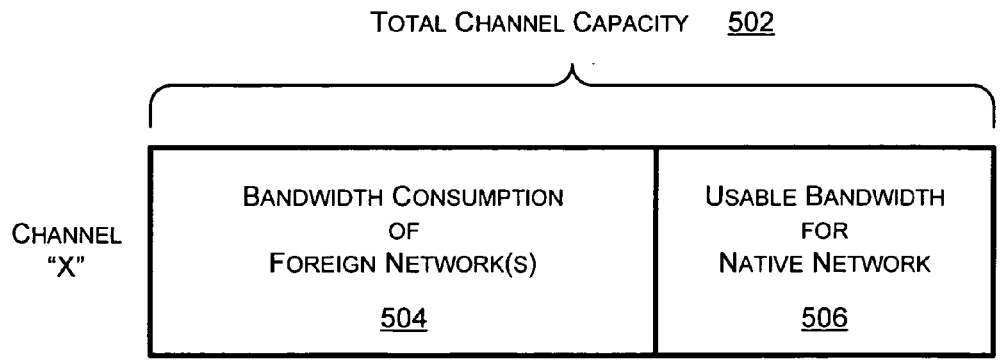

FIGS. 5A and 5B illustrate an example portion of total channel capacity that comprises usable bandwidth for client devices of a native network 100(NN). In other words, FIGS. 5A and 5B illustrate an example of a CQM that comprises usable bandwidth (UB). FIG. 5A diagrams the relationship and differences between a native network 100(NN) and one or more foreign networks 100(FN). FIG. 5B is a block diagram illustrating a usable bandwidth portion of a total channel capacity.

In FIG. 5A, there are two foreign wireless networks 100 (FN) and one native wireless network 100(NN). As indicated by the legend, the "lightning bolt" symbols represent wireless communications on channel "X". There is also a client device 102(CD) pictured as part of native network 100(NN). Client device 102(CD) is ascertaining the usable bandwidth of channel "X" from its perspective. The wireless communications on channel "X" may originate from wireless devices of one of foreign networks 100(FN) or another wireless device, besides the pictured client device 102(CD), of native network 100 (NN).

To ascertain the usable bandwidth of channel "X" from the perspective of client device 102(CD), client device 102(CD) determines the bandwidth consumption of channel "X" that is attributable to foreign networks 100(FN). In other words, and by way of example only, client device 102(CD) detects wireless communications on channel "X". It then permits the continued inclusion of those wireless communications on channel "X" that originate in a foreign network 100(FN)

while removing those wireless communications on channel "X" that originate within native network 100(NN). Alternatively, client device 102(CD) may originally detect those wireless communications on channel "X" that originate in a foreign network 100(FN) while excluding those wireless communications on channel "X" that originate within native network 100(NN).

Regardless, the bandwidth consumption of channel "X" that is attributable to foreign networks 100(FN) is determined and used to ascertain the usable bandwidth of channel "X" for the native network from the perspective of the ascertaining client device 102(CD). This ascertainment is illustrated in FIG. 5B.

In FIG. 5B, a total channel capacity 502 for channel "X" is illustrated. Total channel capacity 502 is divided into two parts: a bandwidth consumption of foreign networks 504 and a usable bandwidth for the native network 506. Hence, the usable bandwidth of channel "X" for the native network 506 from the perspective of the ascertaining client device can be ascertained by subtracting the bandwidth consumption of foreign networks 504 from the total channel capacity 502. In this context, the bandwidth consumption of foreign networks 504 and the total channel capacity 502 are both determined by and from the perspective of client device 102(CD).

Figure 6:
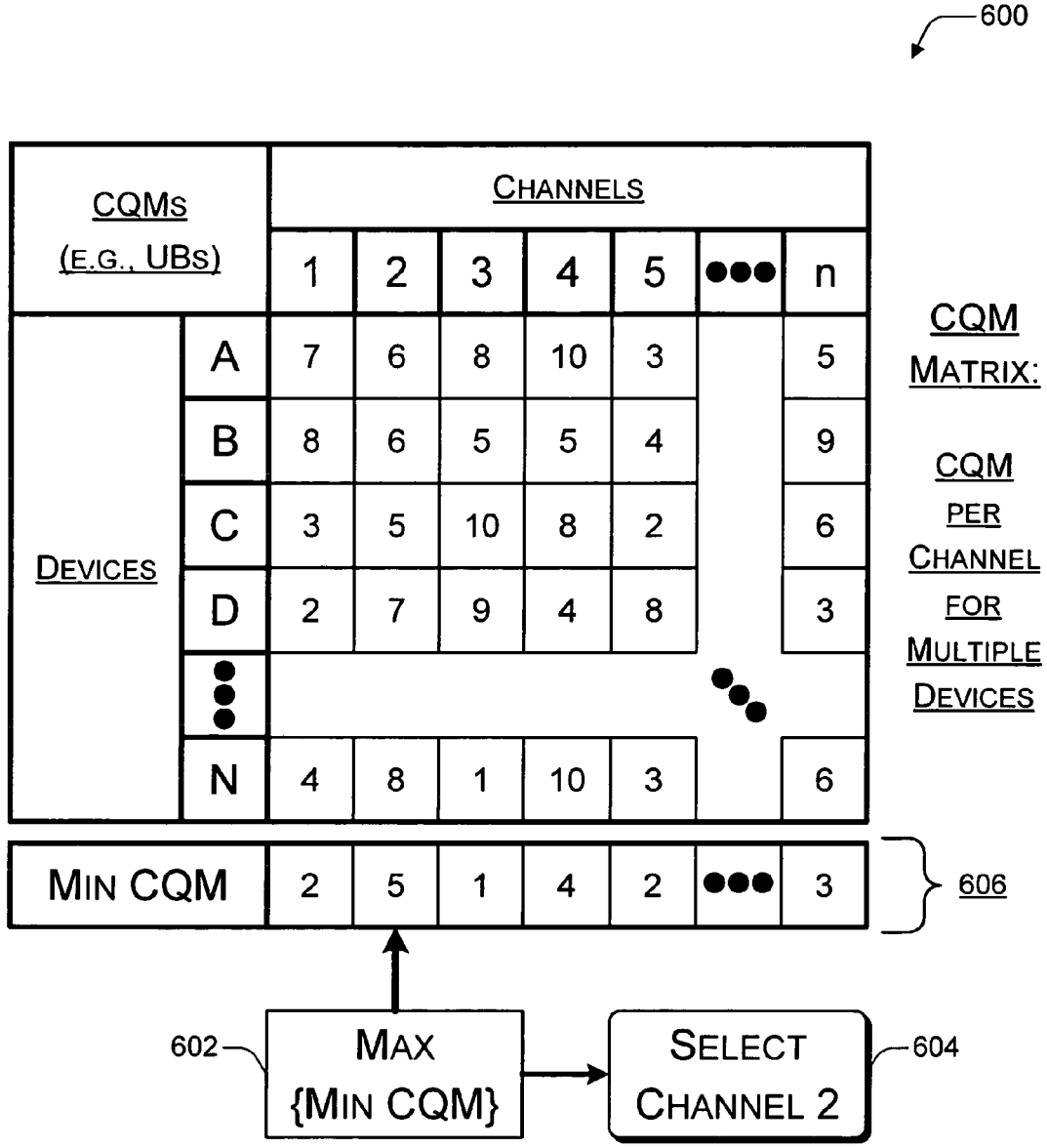
FIG. 6 illustrates an example matrix of channel quality metrics per wireless channel for multiple wireless devices, with the matrix capable of being employed in a wireless network configuration analysis.

FIG. 6 illustrates an example matrix 600 of channel quality metrics per wireless channel for multiple wireless devices, with the matrix capable of being employed in a wireless network configuration analysis. Matrix 600 includes multiple channel quality metric (CQM) values. By way of example only, the CQM values are usable bandwidth (UB) values. However, they may alternatively be another CQM type, including one of those described above.

As illustrated, matrix 600 includes multiple columns and multiple rows for wireless channels and wireless devices, respectively. More specifically, each respective column corresponds to a respective channel 1, 2, 3, 4, 5 . . . n, and each respective row corresponds to a respective device A, B, C, D . . . N. The variables "n" and "N" may be any integer of one or greater.

As part of (i) a channel condition report and/or (ii) channel condition information that is provided in response to a solicitation, a wireless device provides at least one CQM value per channel to the elected coordinator. In other words, each device provides a row of matrix 600 to the elected coordinator to facilitate the wireless network configuration analysis. For example, at some moment, device C ascertained a CQM value of 3 on channel 1, a CQM value of 5 on channel 2, a CQM value of 10 on channel 3, a CQM value of 8 on channel 4, a CQM value of 2 on channel 5 . . . a CQM value of 6 on channel N. These ascertained CQMs per channel are subsequently sent from device C to the elected coordinator.

As described above, the wireless network configuration analysis that potentially produces a new wireless network configuration is effectuated responsive to one or more channel conditions and based on at least one criterion. The coordinator possesses the one or more channel conditions in the form of matrix 600. The at least one criterion may be any one or more of many possible criteria. In a described implementation, however, the at least one criterion is to maximize the minimum CQM, as indicated at block 602.

For explanatory purposes, the minimum CQM for each channel is explicitly indicated at an additional row 606. The values of row 606 indicate that the minimum CQM from the devices A-N is 2, 5, 1, 4, 2 . . . 3 for channels 1, 2, 3, 4, 5 . . . n, respectively. The maximum minimum CQM is determined from the minimum CQMs of row 606. As indicated by block 602, the maximum minimum CQM is 5, which corresponds to channel 2. Hence, the wireless network configuration analysis result is that the wireless network should be reconfigured to transmit on channel 2; channel 2 is therefore selected as indicated by block 604. A channel tuning command to tune to channel 2 is then transmitted from the elected coordinator to the AP and/or to the (other) wireless client devices.

In a described implementation, the at least one criterion on which the wireless network configuration analysis is based comprises determining the channel on which the maximum minimum usable bandwidth exists as measured by the client devices. Another criterion or criteria, besides adjusting the wireless network based on the maximum minimum CQM, may be employed.

For example, a maximum average CQM may be used as the at least one criterion. With the maximum average CQM criterion in the context of matrix 600, channel 4 is selected because it has the highest average CQM at 37/5, assuming N="E"=5. Other example criteria are (i) maximum average CQM with each wireless client device being guaranteed some predetermined minimum CQM for fairness reasons, (ii) maximum sum of the "ln" (logarithm) of the CQM of each wireless client device (i.e., so-called "proportional" fairness), some combination thereof, and so forth.

Regardless of the criterion or criteria that is or are employed, the coordinator may be empowered to ensure that the planned wireless network configuration adjustments will not break any application-specific requirements of the wireless client devices. For example, an application on client device 102(N) may be currently engaged in a real time communication in the form of a videoconference. To this end, any such application-specific requirements of the wireless client devices 102 may be communicated to the elected coordinator, and an enhanced wireless network configuration can be selected from those possibilities that provide any stipulated application-specific bandwidth requirements.

After the wireless network configuration analysis, the network configuration adjuster may decide to perform a channel and/or a power adjustment on the AP (e.g., via Simple Network Management Protocol (SNMP) communications). For example, when the measured CQM cannot satisfy the QoS requirements of the application(s) in some wireless client(s), the power level of an AP may be increased to obtain a better CQM. The power level (e.g., at an AP) may also be decreased to reduce interference to wireless client(s) that are communicating with other AP(s) to produce a better channel condition.

When multiple APs are deployed in a wireless network, the coordinator may also or alternatively suggest a better AP to which the complaining wireless client device may associate. For example, when a wireless client detects that the measured CQM with respect to some other wireless AP is better than that of the AP to which it is currently associated, the wireless client may be instructed to associate with the AP having the better CQM.

Although no specific security measures are described herein, it is contemplated that there exists possibilities for malicious wireless devices to send false channel condition information reports to the elected coordinator or to pretend to be the elected coordinator of a wireless network. A standardized wireless security protocol (e.g., Wi-Fi Protected Access (WPA), Wired Equivalent Privacy (WEP), IEEE 802.11(i), etc.) can be utilized to prevent unauthorized wireless devices from joining a protected wireless network. Also, proprietary security protocols can be incorporated into the wireless network interference mitigation implementations that are described herein to ensure that no unauthorized users can change the configuration of a wireless network (e.g., acting under the guise of being a legitimate elected coordinator).

The devices, actions, aspects, features, functions, procedures, modules, data structures, components, etc. of FIGS. 1-6 are illustrated in diagrams that are divided into multiple blocks. However, the order, interconnections, interrelationships, layout, etc. in which FIGS. 1-6 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for wireless network interference mitigation. Furthermore, although the description herein includes references to specific implementations (including a general device of FIG. 7), the illustrated and/or described implementations can be implemented in any suitable hardware, software, firmware, or combination thereof and using any channel quality metric(s), channel condition monitoring approach(es), channel condition violation threshold(s), coordinator election mechanisms(s), network configuration analysis criterion (criteria), and/or wireless network configuration adjustment(s), and so forth.

Example Operating Environment for Computer or Other Device

Figure 7:
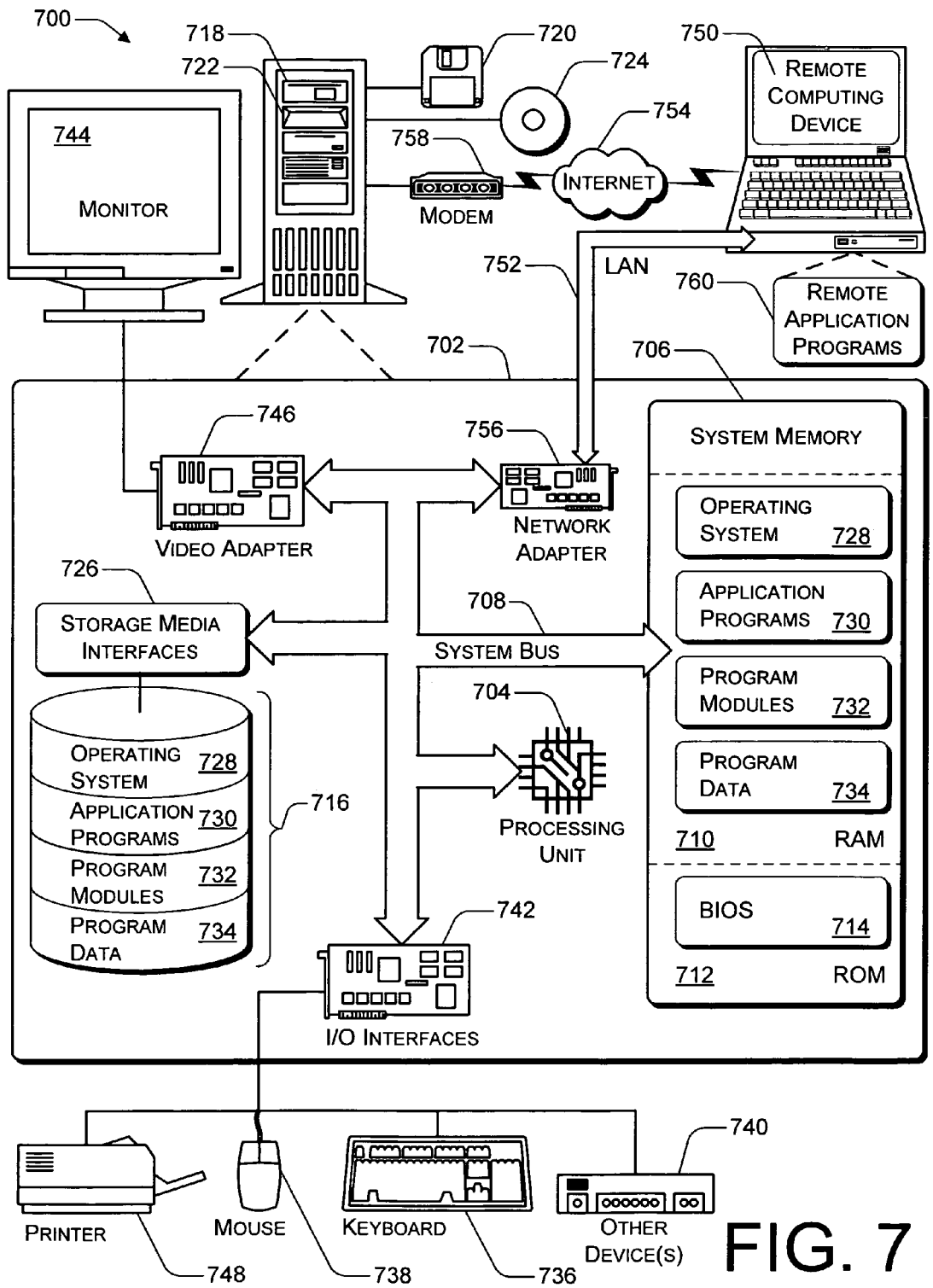
FIG. 7 illustrates an example of a computing (or general device) operating environment that is capable of (wholly or partially) implementing at least one aspect of wireless network interference mitigation as described herein.

FIG. 7 illustrates an example computing (or general device) operating environment 700 that is capable of (fully or partially) implementing at least one system, device, apparatus, component, arrangement, protocol, approach, method, procedure, media, application programming interface (API), some combination thereof, etc. for wireless network interference mitigation as described herein. Operating environment 700 may be utilized in the computer and network architectures described below.

Example operating environment 700 is only one example of an environment and is not intended to suggest any limitation as to the scope of use or functionality of the applicable device (including computer, network node, entertainment device, mobile appliance, general electronic device, etc.) architectures. Neither should operating environment 700 (or the devices thereof) be interpreted as having any dependency or requirement relating to any one or to any combination of components as illustrated in FIG. 7.

Additionally, implementations for wireless network interference mitigation may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for wireless network interference mitigation may be described in the general context of processor-executable instructions. Generally, processor-executable instructions include routines, programs, protocols, objects, functions, interfaces, components, data structures, etc. that perform and/or enable particular tasks and/or implement particular abstract data types. Realizations of wireless network interference mitigation, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 700 includes a general-purpose computing device in the form of a computer 702, which may comprise any (e.g., electronic) device with computing/processing capabilities. The components of computer 702 may include, but are not limited to, one or more processors or processing units 704, a system memory 706, and a system bus 708 that couples various system components including processor 704 to system memory 706.

Processors 704 are not limited by the materials from which they are formed or the processing mechanisms employed therein. For example, processors 704 may be comprised of semiconductor(s) and/or transistors (e.g., electronic integrated circuits (ICs)). In such a context, processor-executable instructions may be electronically-executable instructions. Alternatively, the mechanisms of or for processors 704, and thus of or for computer 702, may include, but are not limited to, quantum computing, optical computing, mechanical computing (e.g., using nanotechnology), and so forth.

System bus 708 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 702 typically includes a variety of processor-accessible media. Such media may be any available media that is accessible by computer 702 or another (e.g., electronic) device, and it includes both volatile and non-volatile media, removable and non-removable media, and storage and transmission media.

System memory 706 includes processor-accessible storage media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is typically stored in ROM 712. RAM 710 typically contains data and/or program modules/instructions that are immediately accessible to and/or being presently operated on by processing unit 704.

Computer 702 may also include other removable/non-removable and/or volatile/non-volatile storage media. By way of example, FIG. 7 illustrates a hard disk drive or disk drive array 716 for reading from and writing to a (typically) non-removable, non-volatile magnetic media (not separately shown); a magnetic disk drive 718 for reading from and writing to a (typically) removable, non-volatile magnetic disk 720 (e.g., a "floppy disk"); and an optical disk drive 722 for reading from and/or writing to a (typically) removable, non-volatile optical disk 724 such as a CD, DVD, or other optical media. Hard disk drive 716, magnetic disk drive 718, and optical disk drive 722 are each connected to system bus 708 by one or more storage media interfaces 726. Alternatively, hard disk drive 716, magnetic disk drive 718, and optical disk drive 722 may be connected to system bus 708 by one or more other separate or combined interfaces (not shown).

The disk drives and their associated processor-accessible media provide non-volatile storage of processor-executable instructions, such as data structures, program modules, and other data for computer 702. Although example computer 702 illustrates a hard disk 716, a removable magnetic disk 720, and a removable optical disk 724, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 700.

Any number of program modules (or other units or sets of processor-executable instructions) may be stored on hard disk 716, magnetic disk 720, optical disk 724, ROM 712, and/or RAM 710, including by way of general example, an operating system 728, one or more application programs 730, other program modules 732, and program data 734. These processor-executable instructions may include, for example, one or more of: wireless network interference mitigation logic 108 (and the components thereof), channel quality metric (CQM) matrix 600, some combination thereof, and so forth.

A user may enter commands and/or information into computer 702 via input devices such as a keyboard 736 and a pointing device 738 (e.g., a "mouse"). Other input devices 740 (not shown specifically) may include a microphone, joystick, game pad, satellite dish, serial port, video camera, scanner, and/or the like. These and other input devices are connected to processing unit 704 via input/output interfaces 742 that are coupled to system bus 708. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 744 or other type of display device may also be connected to system bus 708 via an interface, such as a video adapter 746. Video adapter 746 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 744, other output peripheral devices may include components such as speakers (not shown) and a printer 748, which may be connected to computer 702 via input/output interfaces 742.

Computer 702 may operate in a networked environment using logical connections to one or more remote computers, such as a remote computing device 750. By way of example, remote computing device 750 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 750 is illustrated as a portable computer that may include many or all of the elements and features described herein with respect to computer 702.

Logical connections between computer 702 and remote computer 750 are depicted as a local area network (LAN) 752 and a general wide area network (WAN) 754. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 702 is usually connected to LAN 752 via a network interface or adapter 756. When implemented in a WAN networking environment, computer 702 typically includes a modem 758 or other component for establishing communications over WAN 754. Modem 758, which may be internal or external to computer 702, may be connected to system bus 708 via input/output interfaces 742 or any other appropriate mechanism(s). It is to be appreciated that the illustrated network connections are examples and that other manners for establishing communication link(s) between computers 702 and 750 may be employed.

In a networked environment, such as that illustrated with operating environment 700, program modules or other instructions that are depicted relative to computer 702, or portions thereof, may be fully or partially stored in a remote media storage device. By way of example, remote application programs 760 reside on a memory component of remote computer 750 but may be usable or otherwise accessible via computer 702. Also, for purposes of illustration, application programs 730 and other processor-executable instructions such as operating system 728 are illustrated herein as discrete blocks, but it is recognized that such programs, components, and other instructions reside at various times in different storage components of computing device 702 (and/or remote computing device 750) and are executed by processor(s) 704 of computer 702 (and/or those of remote computing device 750).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. A client device that is capable of engaging in wireless communications and joining a wireless network, the client device comprising:

wireless network interference mitigation logic configured to monitor at least one channel condition of the wireless network and to participate in a wireless network interference mitigation procedure based on the at least one channel condition; and a coordinator elector configured to exchange coordinator election data with other client devices that have joined the wireless network, the coordinator elector configured to cooperate with other coordinator electors of the other client devices to elect a network coordinator.

2. The client device as recited in claim 1, further comprising:

a channel condition monitor that ascertains a channel quality for the at least one channel condition and evaluates the ascertained channel quality with respect to a channel quality threshold.

3. The client device as recited in claim 2, wherein the channel condition monitor is adapted to determine if the ascertained channel quality comports with the channel quality threshold and to produce a channel condition violation notification if the ascertained channel quality is determined to not comport with the channel quality threshold.

4. The client device as recited in claim 3, further comprising:
    a channel condition reporter that receives the channel condition violation notification from the channel condition monitor and produces a channel condition report responsive to the channel condition violation notification.

5. The client device as recited in claim 4, wherein the channel condition monitor ascertains multiple respective channel qualities for multiple respective wireless channels; and
    wherein the channel condition report includes the ascertained multiple respective channel qualities for the multiple respective wireless channels.

6. The client device as recited in claim 1, further comprising:
    a channel condition collector that receives a channel condition report from a particular client device that has joined the wireless network, the channel condition collector adapted to send a channel condition information solicitation to other client devices that have joined the wireless network in response to receiving the channel condition report.

7. A client device for facilitating engagement of wireless communications and joining one or more wireless networks, the client device comprising:
    wireless network interference mitigation logic configured to monitor at least one channel condition of the wireless network and to participate in a wireless network interference mitigation procedure based on the at least one channel condition;
    a channel condition monitor configured to ascertain a channel quality for the at least one channel condition and evaluates the ascertained channel quality with respect to a channel quality threshold, wherein the channel condition monitor is adapted to determine if the ascertained channel quality comports with the channel quality threshold and to produce a channel condition violation notification if the ascertained channel quality is determined to not comport with the channel quality threshold;
    a channel condition reporter configured to receive the channel condition violation notification from the channel condition monitor and produce a channel condition report responsive to the channel condition violation notification; and
    a coordinator elector configured to exchange coordinator election data with other client devices that have joined the wireless network, the coordinator elector configured to cooperate with other coordinator electors of the other client devices to elect a network coordinator; and
    wherein the channel condition reporter is adapted to send the channel condition report to the elected network coordinator.

8. A client device for facilitating engagement of in wireless communications and joining one or more wireless networks, the client device comprising:
    wireless network interference mitigation logic configured to monitor at least one channel condition of the wireless network and to participate in a wireless network interference mitigation procedure based on the at least one channel condition;
    a channel condition collector configured to receive a channel condition report from a particular client device that has joined the wireless network, the channel condition collector adapted to send a channel condition information solicitation to other client devices that have joined the wireless network in response to receiving the channel condition report; and
    a network configuration analyzer configured to analyze channel condition information that is received from the other client devices by the channel condition collector in response to the channel condition information solicitation, the network configuration analyzer further adapted to determine a different wireless network configuration that mitigates wireless network interference; and
    a network configuration adjuster that is capable of issuing network configuration adjustment commands to implement the different wireless network configuration.

9. The client device as recited in claim 8, wherein the network configuration analyzer is further adapted to determine the different wireless network configuration based on maximizing a minimum usable bandwidth for client devices that have joined the wireless network, the usable bandwidth comprising a bandwidth capacity of a given channel that is not consumed by communications originating from foreign networks.

10. A method for a wireless client device, the method comprising:
    participating, by the wireless client device, in a coordinator election from among multiple devices, the elected coordinator responsible for coordinating wireless network interference mitigation;
    monitoring, by the wireless client device, a channel condition of a wireless channel at the wireless client device;
    detecting, by the wireless client device, that a monitored channel condition violates a channel condition threshold; and
    when the monitored channel condition is detected to violate the channel condition threshold, reporting, by the wireless client device, the monitored channel condition to the elected coordinator.

11. The method as recited in claim 10, further comprising:
    collecting at the wireless client device channel condition information from multiple other wireless devices by sending a channel condition information solicitation to the multiple other wireless devices; and
    analyzing a wireless network configuration of a wireless network responsive to the collected channel condition information and based on at least one criterion.

12. The method as recited in claim 11, wherein the collected channel condition information comprises a respective channel quality metric for a respective wireless channel of multiple wireless channels that are received from each wireless device of the multiple other wireless devices; and wherein the at least one criterion comprises a criterion selected from a group comprising (i) maximizing a minimum channel quality metric of the wireless devices and (ii) maximizing an average channel quality metric of the wireless devices.

13. The method as recited in claim 10, wherein the monitoring comprises:
    monitoring a usable bandwidth of the wireless channel from a perspective of the wireless client device, the usable bandwidth comprising a bandwidth of the wireless channel that may be utilized by wireless devices of a wireless network of which the wireless client device forms a part.

14. A method for a wireless client device, the method comprising:

monitoring, by the wireless client device, a channel condition of a wireless channel at the wireless client device;

detecting, by the wireless client device, that a monitored channel condition violates a channel condition threshold;

when the monitored channel condition is detected to violate the channel condition threshold, reporting, by the wireless client device, the monitored channel condition to a coordinator;

collecting at the wireless client device channel condition information from multiple other wireless devices by sending a channel condition information solicitation to the multiple other wireless devices; and analyzing, by the coordinator, a wireless network configuration of a wireless network responsive to the collected channel condition information and based on at least one criterion, wherein the collected channel condition information comprises a respective channel quality metric for a respective wireless channel of multiple wireless channels that are received from each wireless device of the multiple other wireless devices; and wherein the at least one criterion comprises a criterion selected from a group comprising (i) maximizing a minimum channel quality metric of the wireless devices and (ii) maximizing an average channel quality metric of the wireless devices.

15. A method for a wireless client device, the method comprising:

monitoring, by the wireless client device, a channel condition of a wireless channel at the wireless client device;

detecting, by the wireless client device, that a monitored channel condition violates a channel condition threshold;

when the monitored channel condition is detected to violate the channel condition threshold, reporting, by the wireless client device, the monitored channel condition to a coordinator;

collecting at the wireless client device channel condition information from multiple other wireless devices by sending a channel condition information solicitation to the multiple other wireless devices;

analyzing, by the coordinator, a wireless network configuration of a wireless network responsive to the collected channel condition information and based on at least one criterion; and reconfiguring, by the coordinator, the wireless network responsive to the analyzing by issuing a network configuration adjustment command selected from a group of commands comprising (i) tuning a wireless channel, (ii) changing a power level of an access point, and (iii) instructing a client device to associate with a different access point.

* * * * *